(12) United States Patent
Azizi et al.

(10) Patent No.: US 10,732,880 B2
(45) Date of Patent: Aug. 4, 2020

(54) LAZY MEMORY DEDUPLICATION

(71) Applicant: Intel Corporation, Santa Clara, CA (US)

(72) Inventors: Omid Azizi, Redwood City, CA (US); Amin Firoozshahian, Mountain View, CA (US); John Stevenson, Palo Alto, CA (US); Mahesh Maddury, Santa Clara, CA (US); Chandan Egbert, San Jose, CA (US); Henk Neefs, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 15/868,787

(22) Filed: Jan. 11, 2018

(65) Prior Publication Data

US 2019/0212935 A1    Jul. 11, 2019

(51) Int. Cl.
| | |
|---|---|
| *G06F 3/06* | (2006.01) |
| *G06F 12/02* | (2006.01) |
| *G06F 12/0811* | (2016.01) |
| *G06F 12/084* | (2016.01) |
| *G06F 12/0868* | (2016.01) |

(52) U.S. Cl.
CPC ............ *G06F 3/0641* (2013.01); *G06F 3/065* (2013.01); *G06F 3/0607* (2013.01); *G06F 3/0608* (2013.01); *G06F 3/0653* (2013.01); *G06F 12/0253* (2013.01); *G06F 12/084* (2013.01); *G06F 12/0811* (2013.01); *G06F 12/0868* (2013.01); *G06F 2212/283* (2013.01); *G06F 2212/604* (2013.01); *G06F 2212/702* (2013.01)

(58) Field of Classification Search
CPC .... G06F 3/0641; G06F 3/0607; G06F 3/0608; G06F 3/065; G06F 3/0653; G06F 12/0253; G06F 12/0811; G06F 12/084; G06F 12/0868; G06F 2212/283; G06F 2212/604; G06F 2212/702
See application file for complete search history.

(56) References Cited

U.S. PATENT DOCUMENTS

| | | | | |
|---|---|---|---|---|
| 9,678,683 | B1 * | 6/2017 | Chen | G06F 3/0631 |
| 9,710,165 | B1 * | 7/2017 | Lherault | G06F 3/0608 |
| 2014/0229675 | A1 * | 8/2014 | Aizman | G06F 3/0608 711/117 |
| 2019/0073151 | A1 * | 3/2019 | Marinescu | G06F 3/0641 |

\* cited by examiner

*Primary Examiner* — Eric Cardwell
(74) *Attorney, Agent, or Firm* — Schwegman Lundberg & Woessner, P.A.

(57) ABSTRACT

Various systems and methods for computer memory management are described herein. A system for computer memory management includes a first memory device including a mapping table; a second memory device including a staging area; a third memory device including a dedup data region; and a controller operable to: receive a memory access request, the memory access request including an address and data; write the data to the staging area; and update the mapping table with the address.

19 Claims, 19 Drawing Sheets

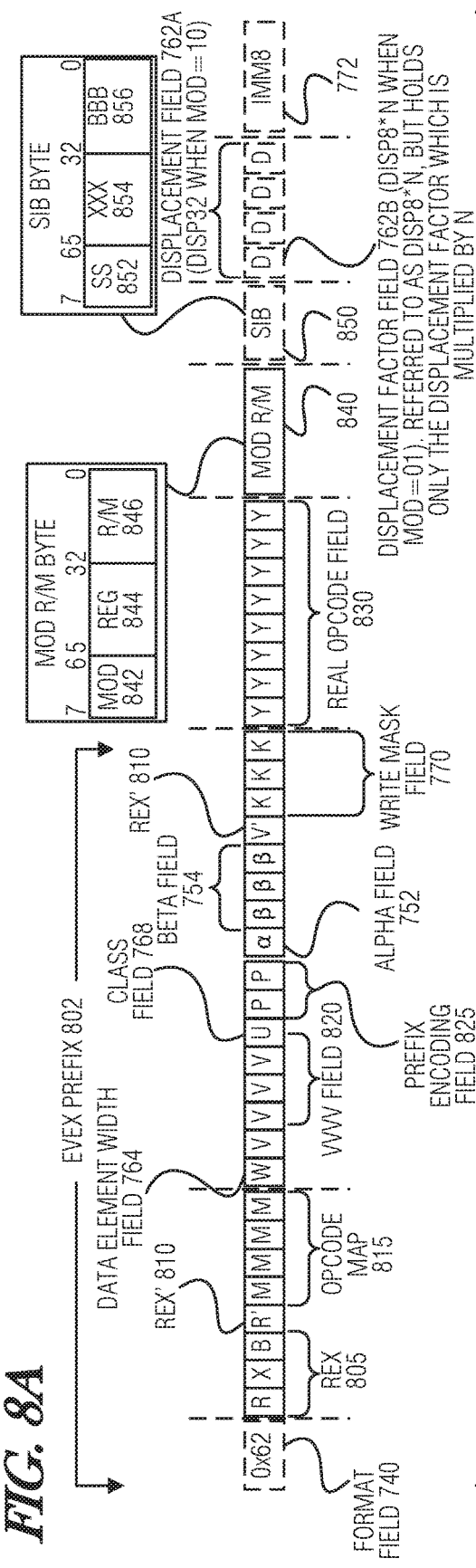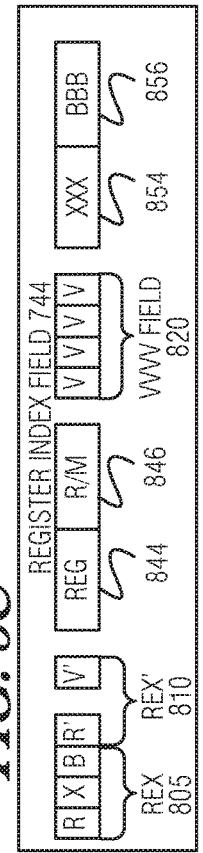
FIG. 8A
FIG. 8B
FIG. 8C

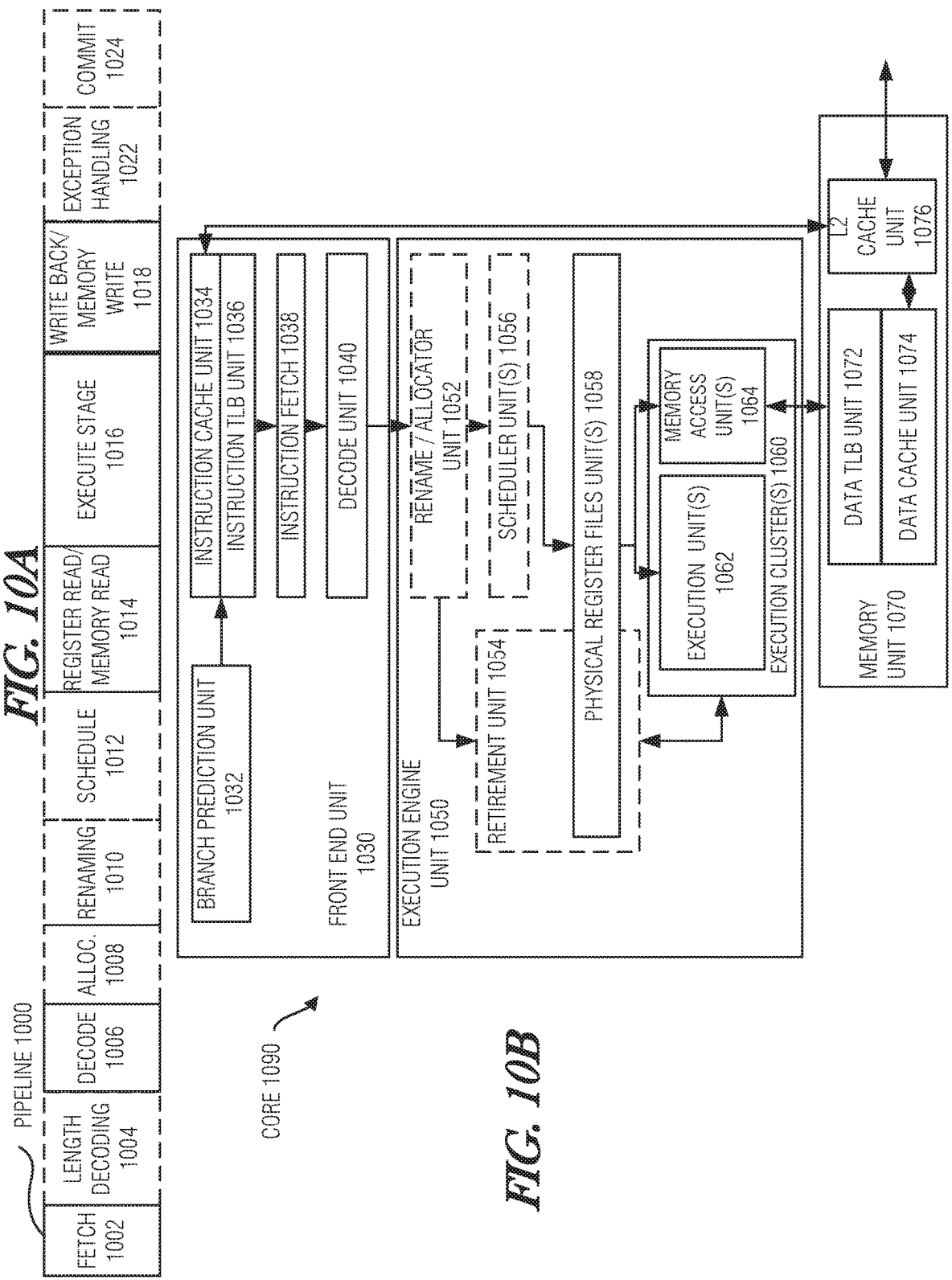

LAZY MEMORY DEDUPLICATION

TECHNICAL FIELD

Embodiments described herein generally relate to computer memory management, and in particular, to systems and methods for lazy memory deduplication.

BACKGROUND

In modern computing systems, memory system capacity has not kept pace with increased system complexity and application requirements, making memory availability and performance an increasingly limiting factor. Memory costs are a significant portion of total system cost. Accordingly, it would be an advance in the art to provide improved memory management.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 8A-8D are block diagrams illustrating a specific vector friendly instruction format according to an embodiment;

FIG. 10A is a block diagram illustrating both an in-order pipeline and a register renaming, out-of-order issue/execution pipeline according to an embodiment;

FIG. 10B is a block diagram illustrating both an in-order architecture core and a register renaming, out-of-order issue/execution architecture core to be included in a processor according to an embodiment;

DETAILED DESCRIPTION

Figure 1:
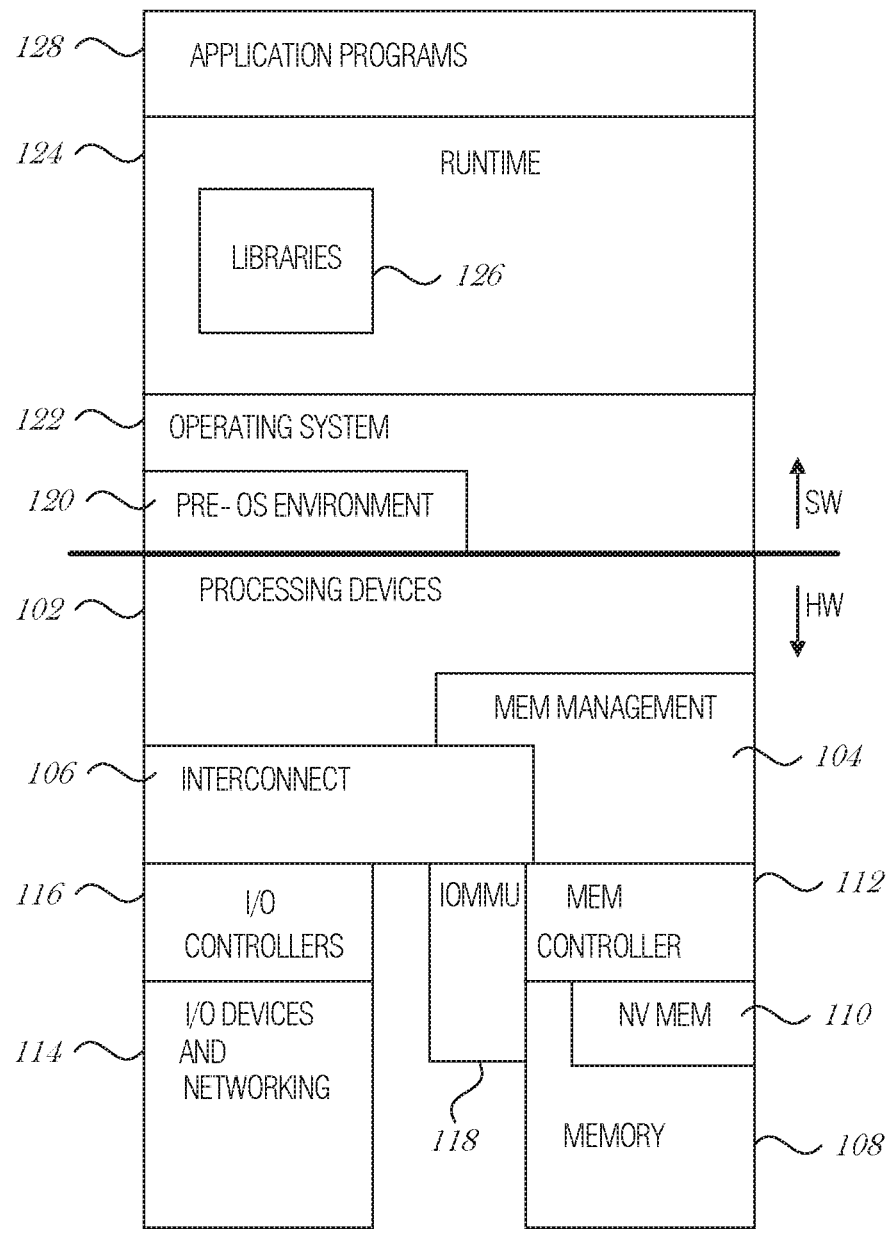
FIG. 1 is a diagram illustrating hardware and software architecture of a computer system, in which various interfaces between hardware components and software components are shown, according to an embodiment.

In the following description, for purposes of explanation, numerous specific details are set forth in order to provide a thorough understanding of some example embodiments. It will be evident, however, to one skilled in the art that the present disclosure may be practiced without these specific details.

In a central processor unit (CPU), data and instructions are retrieved from cache. Modern CPUs have several levels of cache. The levels are commonly referred to as level one (L1), level two (L2), and level three (L3) cache. Data is transferred between main memory and cache in blocks of a fixed size called cache lines or cache blocks. When a cache line is copied into cache, a cache entry is created. When a cache line is evicted, it is written back to the memory. It is possible that multiple processes, or even the same process, to own cache lines at different addresses that contain the exact same values. This is known as duplicated data.

Memory deduplication is the process for efficient memory use. Instead of storing multiple cache lines with the same data (or instruction) in memory, additional data structures are used to track which addresses may store the same "deduplicated" data. Memory deduplication is performed in hardware and may be a part of the memory controller.

Memory deduplication may incur high memory bandwidth overhead due to the content lookup processes from memory. For instance, in a general form, on each write the memory deduplication process requires a scan of some or all of the contents of memory to determine whether duplicate data exists. What is needed is a more efficient memory deduplication process. Even with a highly optimized search process, it may take multiple (e.g., 3 or more) memory accesses to deduplicate a write, and therefore writes consume memory bandwidth.

The present document describes an in-memory lazy deduplication process that addresses the bandwidth cost of the general form of memory deduplication. The lazy deduplication dramatically reduces the bandwidth consumption of a deduplicated memory system. In some cases, the bandwidth savings are 30-40% or more.

Lazy deduplication focuses the deduplication process on stable data, rather than quickly-changing data. It does so by introducing a staging area to delay the deduplication process. This staging area acts as a re-write filter, allowing modifications to the data to be absorbed before incurring the deduplication cost in memory.

The key insight of lazy deduplication is that it is a wasted effort to deduplicate the data of a write to an address which will be re-written again in the near future. For example, if a particular address in memory is part of an application's larger working set and is still changing regularly, it would save memory bandwidth if the deduplication process were invoked only after the data had stabilized. As such, lazy deduplication tries to deduplicate data that is stable—either read-heavy addresses, or addresses not being actively manipulated by the software.

FIG. 1 is a diagram illustrating hardware and software architecture 100 of a computing system, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices, e.g., PCI. USB, etc. Memory 108 (e.g., dynamic random access memory—DRAM) and non-volatile memory 110 such as flash memory (e.g., electrically-erasable read-only memory—EEPROM, NAND Flash, NOR Flash, etc.) are interfaced with memory management device 104 and interconnect 106 via memory controller 112. This architecture implementation 100 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by meditating access to memory 108 from I/O device 114. IOMMU 118 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basis operability of the computing device itself.

Figure 2:
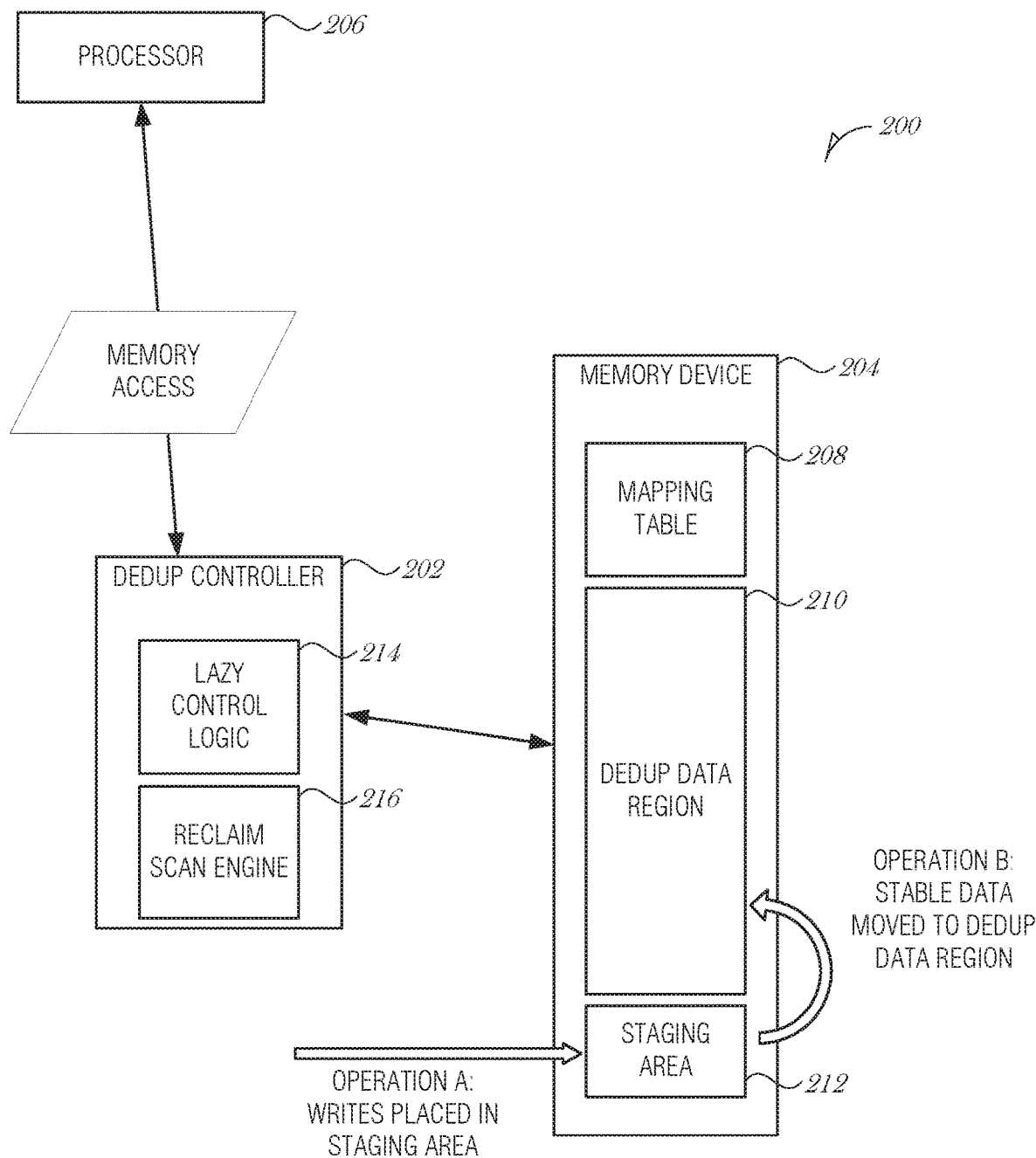
FIG. 2 is a block diagram illustrating a lazy memory deduplication implementation, according to an embodiment.

FIG. 2 is a block diagram illustrating a lazy memory deduplication implementation 200, according to an embodiment. The lazy memory deduplication implementation 200 includes a dedup controller 202 (or controller) and a memory device 204. The memory device 204 may be main memory, portions of which may be cached in an instruction or data cache, such as an L1. L2, or L3 cache, associated with a processor 206.

The dedup controller 202 may be part of or integrated to operate with memory controllers or other interfaces, such as memory management device 104 or memory controller 112 of FIG. 1. Alternatively, dedup controller 202 may be part of or integrated to operate with processor 1200 or memory controller unit 1214 of FIG. 12. The dedup controller 202 may be a controller that is separate from existing memory control devices. In general, the dedup controller 202 may be located anywhere between the processor 206 (e.g., cores) and the memory 204. While the dedup controller 202 may be incorporated into a memory controller, it may also be a separate circuit on-die with the cores, or off-die from the cores as a separate ASIC, FPGA, or other circuitry.

The memory device 204 includes several use areas: a mapping table 208, a dedup data region 210, and a staging area 212. The mapping table 208 is used to store references between the processor-address space and the address space in the dedup data region 210. The dedup data region 210 stores lines of deduplicated data or instructions. The staging area 212 is used to store in main memory, newly-written cache lines. The staging area 212 acts as a buffer or cache to the dedup data region 210 and smoothes out memory accesses to the dedup data region 210. The staging area 212 is sized to balance the benefits of the staging area 212 against the benefits of the dedup data region 210. In an embodiment, the staging area 212 is 10% of the dedup data region 210.

The memory device 204 may constitute a single device, or it may represent multiple devices that are on-die, in a shared package, on a shared PCB, or on a shared bus, in various embodiments. As such, the mapping table 208, dedup data region 210, and staging area 212 may be stored in a single memory device or on multiple memory devices. Depending on the size of each data structure (208, 210, or 212) or memory organization, the mapping table 208, dedup data region 210, or staging area 212 may be stored across several memory devices.

The dedup controller 202 intercepts memory accesses from the processor 206 and implements logic to service the read or write request. In particular, the dedup controller 202 manages the level of indirection using the mapping table 208. In response to a write operation, data is written to the staging area 212 (Operation A). Here, a write to the staging area 212 only uses a single write in contrast to the more general deduplication process that requires multiple memory accesses.

After writing to the staging area 212, the mapping table 208 is updated to point the address to the location within the staging area 212. When the process attempts to access the location again, the address in the mapping table 208 is translated to the location in the staging area 212. As long as the data stays in the staging area 212, it absorbs re-writes at a low cost. In particular, writes to addresses mapped to the staging area 212 simply overwrite the contents directly in the staging area 212. This activity is referred to as re-write filtering and is key to bandwidth savings. By avoiding the dedup data region 210 lookup, writes and re-writes are simple atomic activities with little overhead other than the address translation.

The dedup controller 202 has a secondary function, to move stable data from the staging area 212 to the dedup data region 210 (Operation B). This function is referred to as "reclamation" as it reclaims memory capacity from duplicated data. The reclamation function is performed in parallel with memory accesses to the staging area 212. The reclamation function may be a process that is triggered by the dedup controller 202 based on various conditions.

In an embodiment, the dedup controller 202 includes a lazy control circuitry 214 and a reclaim scan circuitry 216. The lazy control circuitry 214 monitors the number of writes to the staging area 212, the utilization of the staging area 212, and initiates the reclaim scan circuitry 216 according to the conditions of the staging area 212. The staging area 212 is a fixed size, so to maintain a steady-state, on average, for every write that places data into the staging area 212 there needs to be a matching reclamation that moves data out of the staging area 212.

When the staging area 212 becomes more full, the lazy control circuitry 214 activates the reclaim scan circuitry 216 to deduplicate lines out of the staging area 212 and move them to the dedup data region 210. Because the reclamation process requires a table scan of the mapping table 208, it is not instantaneous. As such, the lazy control circuitry 214 is configured to activate the reclaim scan circuitry 216 before the staging area 212 becomes completely full.

If there is a sustained burst of writes that completely fill the staging area 212, then the lazy control circuitry 214 may disable the writes to the staging area 212 and writes are deduplicated on the fly. The timing of the reclamation process is described further in FIG. 3 below.

The reclaim scan circuitry 216 may use a heuristic to identify which lines in the staging area 212 are deduplicated to the dedup data region 210. In an embodiment, the reclaim scan circuitry 216 scans the mapping table 208 to identify entries that point into the staging area 212. The reclaim scan circuitry 216 may initiate deduplication on those lines. Although this heuristic may occasionally select a wrong choice, selecting data that is going to change soon, the address will be mapped back into the staging area 212 on the next write. So long as the reclamation rate is not running so fast as to cause many such mistakes, the re-write filtering rates stay high.

The reclaim scan circuitry 216 may use a time-based heuristic and apply an aging mechanism to writes. For instance, a coarse-grained timestamp may be stored in the mapping table 208 after each write. The timestamp is used to age the address of the corresponding newly-written data. Based on the timestamp, the reclaim scan circuitry 216 may process a subset of addresses in the mapping table 208 from oldest to newest. A rolling 2-bit timestamp may be used to generate four epochs and the reclaim scan circuitry 216 may be configured to rotate through the epochs in a manner to process oldest writes first. Other timestamp formats may be used, such as a 1-bit, 3-bit, 4-bit, or other field length.

Figure 3:
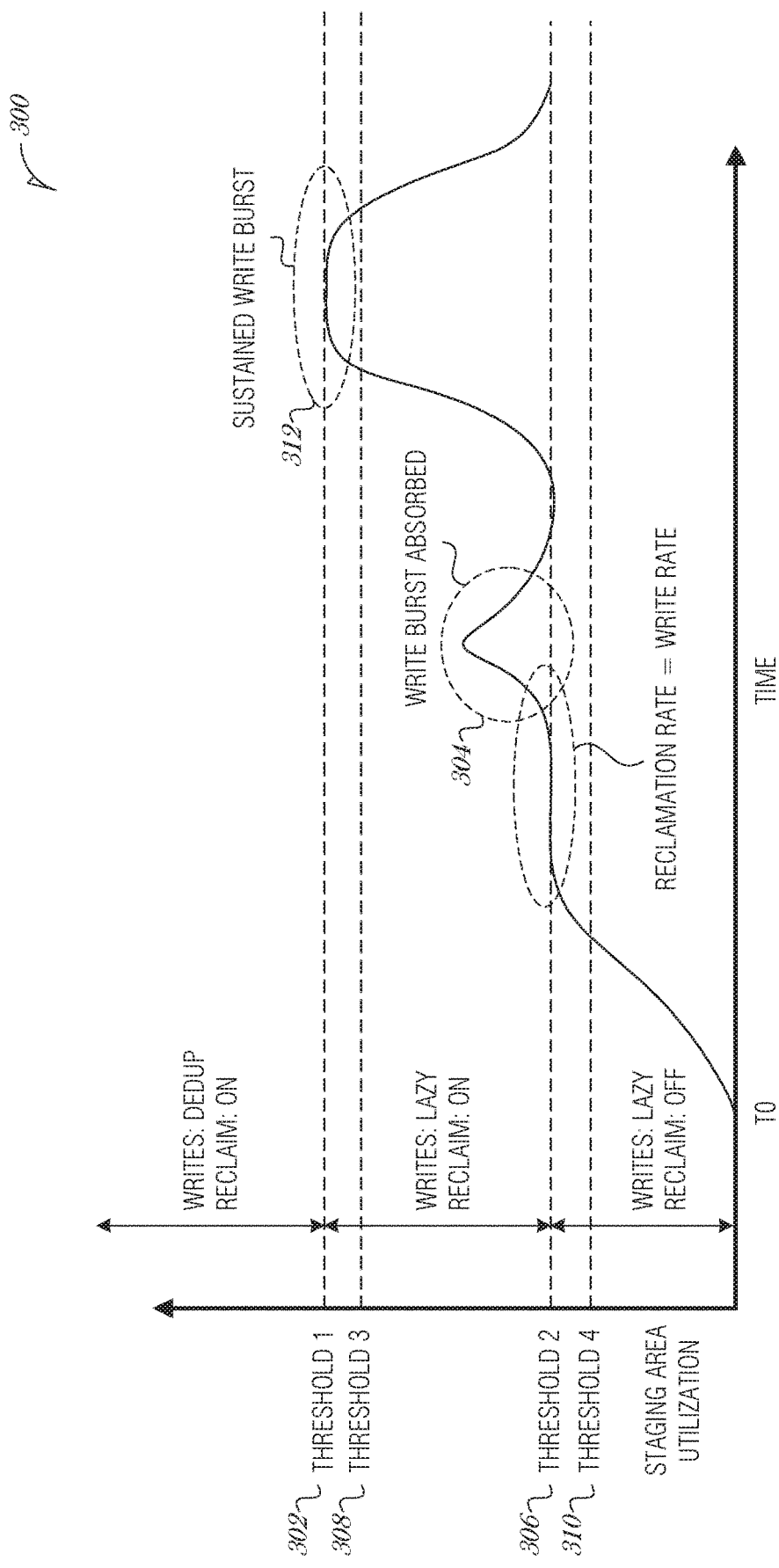
FIG. 3 is a chart illustrating staging area utilization over time, according to an embodiment.

FIG. 3 is a chart 300 illustrating staging area utilization over time, according to an embodiment. At time T0, the staging area is at 0% utilization. After the system begins processing, the staging area utilization increases steadily. Thresholds are used to trigger certain operations. Threshold 1 302 indicates that the number of writes to the staging area is outpacing the number of reclamations. At Threshold 1 302, the lazy control circuitry 114 initiates the reclaim scan circuitry 116 to begin reclamation. For a time, the reclamation rate roughly equals the write rate, resulting in a steady state at Threshold 1 302. If the staging area utilization falls below Threshold 1 302, then the reclamation may be suspended.

At section 304, a write burst occurs. The write burst is absorbed by the staging area. At a later time, a larger write burst 312 causes the staging area to completely fill. Threshold 2 306 is at 100% of staging area utilization. At Threshold 2 306, the lazy writes to the staging area are disabled and conventional deduplication processes may be used to fill the dedup data region. Optionally, at this stage, the reclamation process may be modified to be more aggressive, such as by operating more frequently, in order to reduce the staging area utilization.

In order to avoid thrashing around various thresholds, additional thresholds Threshold 3 308 and Threshold 4 310 are used to change from a higher staging utilization phase to a lower staging utilization phase. For instance, after exceeding Threshold 1 302 and initiating the reclamation process, to disable the reclamation process, the staging utilization needs to fall below Threshold 3 308. Similarly, after filling the staging area and reaching Threshold 2 306, the utilization has to fall below Threshold 4 310 before lazy writes to the staging area are resumed.

Additional thresholds may be used to trigger actions as the staging area utilization rises or lowers, according to different implementation designs. For instance, a stepped increase may be used to graduate from a low reclamation priority to a medium, and then to a high priority. As the priority increases, the reclamation process may be executed at a higher frequency, use different heuristics, or otherwise be more aggressive to reduce the staging area utilization.

Alternatively, a continuous function may be used to adjust the operation of the reclamation process as the utilization of the staging area increases and decreases. The function may adjust the operation of the reclamation process for within a certain subrange of utilization (e.g., from 30% to 100% utilization, or from 50% to 100% utilization). Alternatively, the continuous function may be applied across the entire range of utilization (e.g., 0% to 100% utilization).

Figure 4:
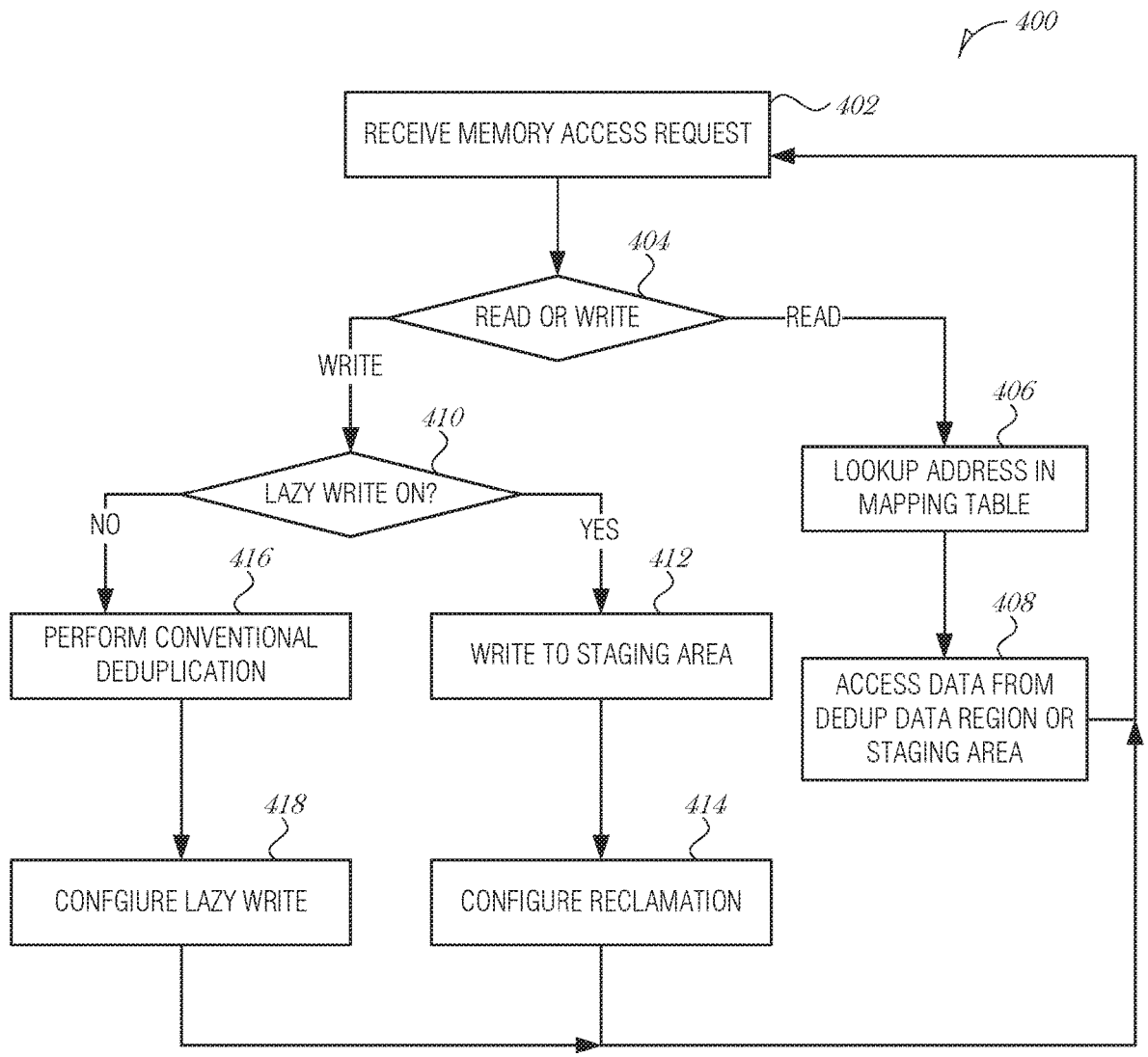
FIG. 4 is a flowchart illustrating a method for computer memory management, according to an embodiment.

FIG. 4 is a flowchart illustrating a method 400 for computer memory management, according to an embodiment. At 402, a memory access request is received. The memory access request is received (e.g., intercepted) at a controller, such as dedup controller 202 of FIG. 2. If the request is for a read operation (decision block 404), then an address is looked up in the mapping table (operation 406) and the data is accessed from the dedup data region or the staging area (operation 408), depending on where the data resides.

If instead the memory access request is a write operation, then it is determined whether the lazy write function is active (decision block 410). If the lazy write function is active, then the data is written to the staging area (operation 412) and the mapping table is updated. After a write occurs, the reclamation process is configured (operation 414). The reclamation process may be activated or deactivated based on one or more thresholds, as described above with respect to FIGS. 2 and 3. Reclamation may occur in the background of other read and write access request processing.

Returning to the decision at block 410, if the lazy write is not active, then the data is written to the dedup data region using a conventional deduplication process (operation 416). The conventional deduplication process may scan some or all of the dedup data region to determine whether other data exists that matches the data in the memory access request, and if there is a matching data, then the mapping table is updated for the memory access request. Conventional deduplication may utilize a hash-based search of the dedup data region.

After the conventional deduplication process is executed, the lazy write is configured (operation 418). If the conventional deduplication process was in use, then the lazy write was deactivated due to the high utilization of the staging area. If the reclamation process has reduced the utilization enough, the lazy write may be re-activated, as described above with respect to FIGS. 2 and 3.

Figure 5:
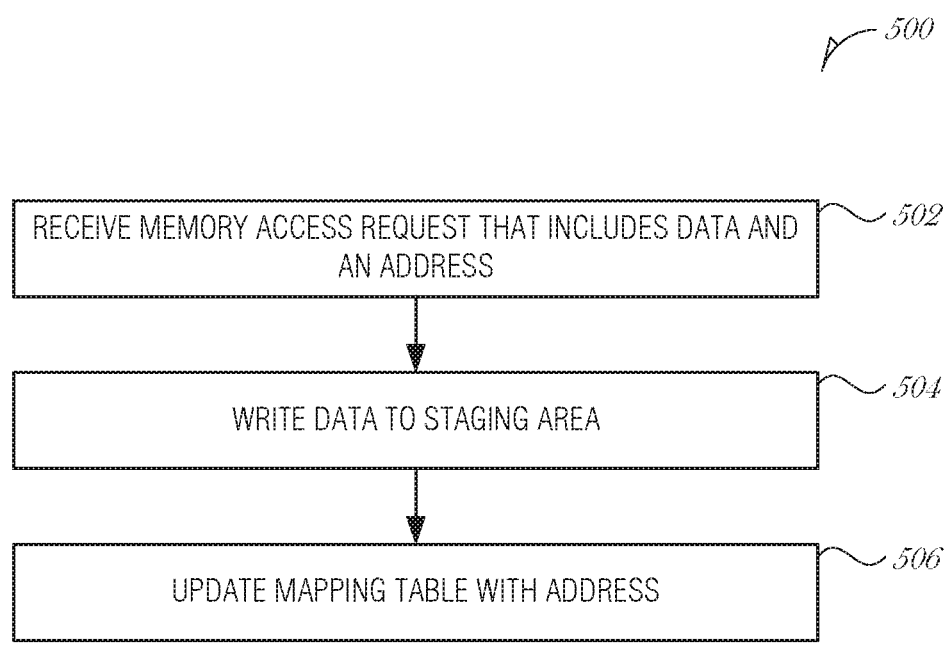
FIG. 5 is a flowchart illustrating a method for computer memory management, according to an embodiment.

FIG. 5 is a flowchart illustrating a method 500 for computer memory management, according to an embodiment. At 502, a memory access request is received, where the memory access request includes an address and data. The memory access request may be received at a controller, such as dedup controller 202 of FIG. 2.

At 504, the data is written to a staging area in a memory device, where the staging area is used to store data temporarily before it is deduplicated.

At 506, a mapping table is updated with the address, where the mapping table is stored in the memory device.

In an embodiment, the method 500 includes monitoring the staging area to determine a utilization amount. The method 500 also includes configuring a reclamation process based on the utilization amount, the reclamation process configured to deduplicate data in the staging area and move duplicate data to a dedup data region in the memory device.

In an embodiment, the reclamation process is used to scan the staging area to identify duplicate data, write a copy of the duplicate data to the dedup data region at a destination address, update the mapping table with the destination address for entries that pointed to the duplicate data, and delete the duplicate data from the staging area.

In an embodiment, monitoring the staging area comprises determining that the utilization amount is under a first threshold, and configuring the reclamation process comprises disabling the reclamation process while the utilization amount is under the first threshold. In a further embodiment, the first threshold is 50% utilization of the staging area. It is understood that any percentage of utilization may be used.

In an embodiment, monitoring the staging area comprises determining that the utilization amount is over a first threshold and under a second threshold, and configuring the reclamation process comprises enabling the reclamation process while the utilization amount is over the first threshold. In a further embodiment, the second threshold is 100% utilization of the staging area.

In an embodiment, monitoring the staging area comprises determining that the utilization amount is at or over a second threshold, and configuring the reclamation process comprises enabling the reclamation process while the utilization amount is at or over the second threshold. In such an embodiment, the method 500 further includes disabling further writes to the staging area while the utilization amount is at or over the second threshold. In a further embodiment, the method 500 includes enabling a conventional deduplication process while the utilization amount is at or over the second threshold.

In an embodiment, configuring the reclamation process comprises using the utilization amount in a continuous function to configure a behavior of the reclamation process. For instance, the reclamation process may be executed every n milliseconds, where n is a result of a linear function of the percentage of utilization.

In an embodiment, configuring the reclamation process includes selecting based on a temporal marker, a set of addresses that refer to the staging area, the set of addresses stored in the mapping table and processing the set of addresses in the reclamation process. In a further embodiment, the temporal marker is a timestamp that was stored when the corresponding data was written to the staging area. In a further embodiment, the timestamp is a 2-bit timestamp.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry." as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 6:
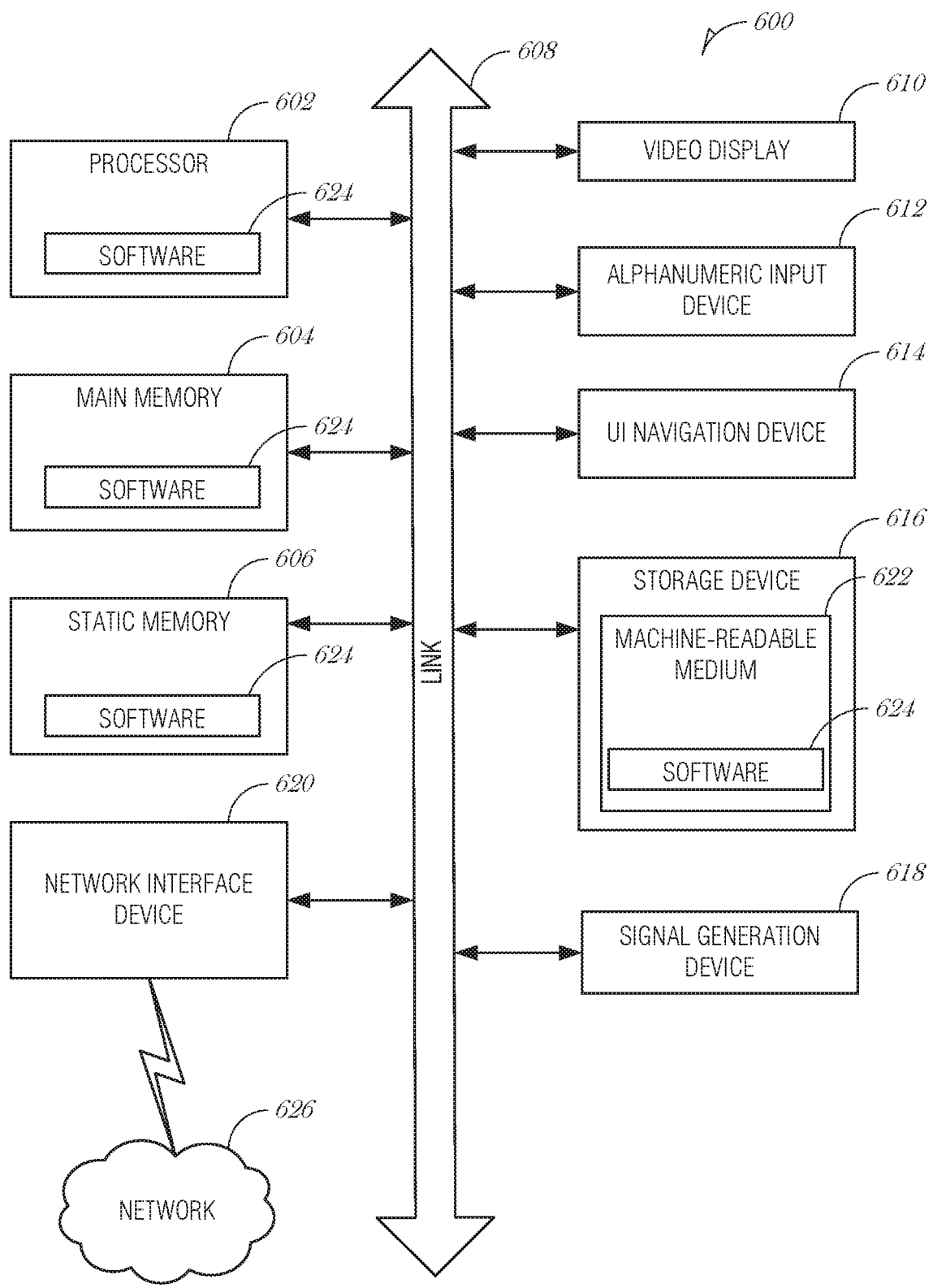
FIG. 6 is a block diagram illustrating an example machine upon which any one or more of the techniques (e.g., methodologies) discussed herein may perform, according to an embodiment.

FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The figures below detail architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an ADD instruction has a specific opcode and an instruction format that includes an opcode field to specify that opcode and operand fields to select operands (source 1/destination and source 2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual September 2014; and see Intel® Advanced Vector Extensions Programming Reference, October 2014).

Instruction Formats

Embodiments of the instruction(s) described herein may be embodied in different formats. Additionally, systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7A:
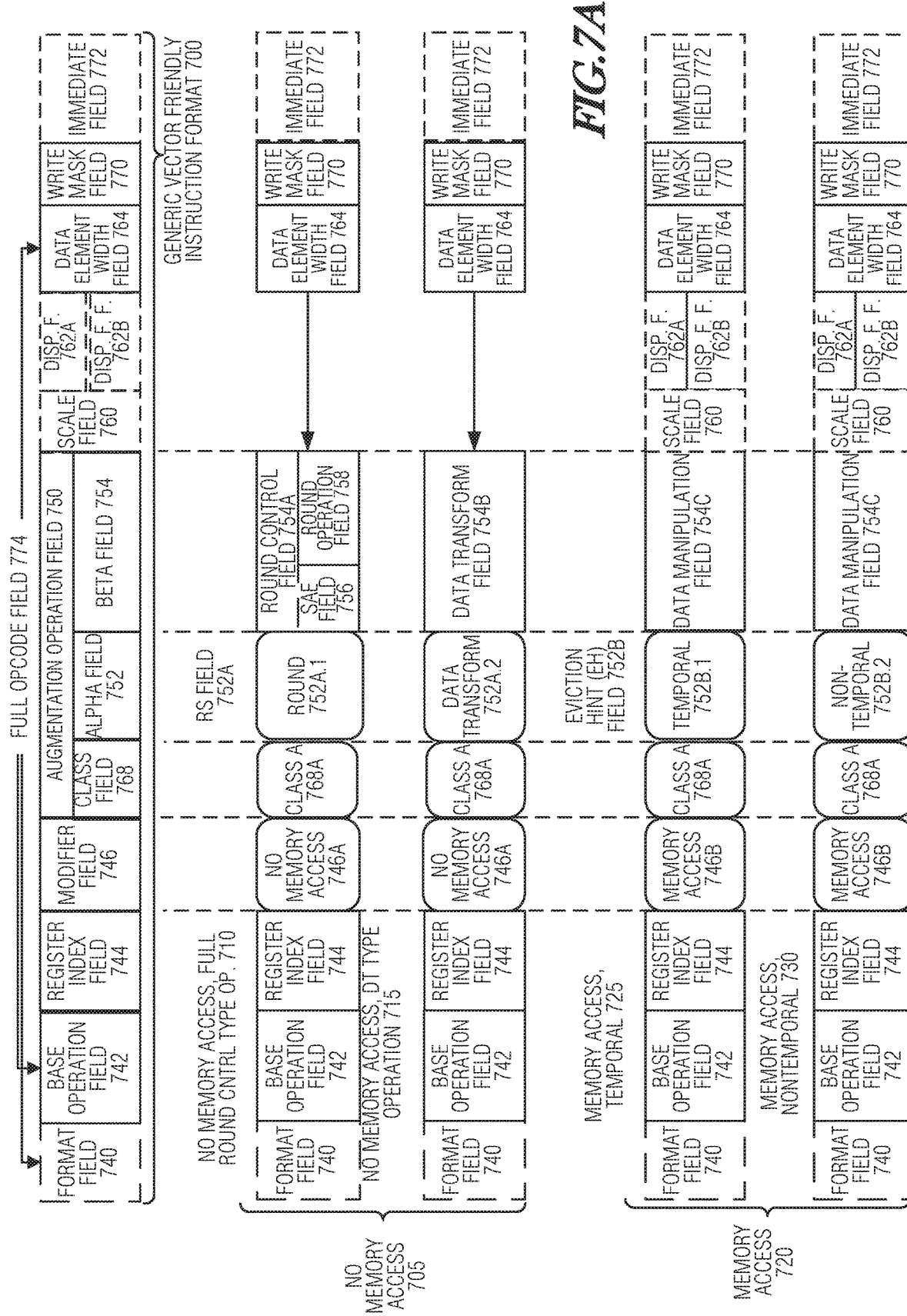
FIGS. 7A-7B are block diagrams illustrating a generic vector friendly instruction format and instruction templates thereof according to an embodiment.
Figure 7B:
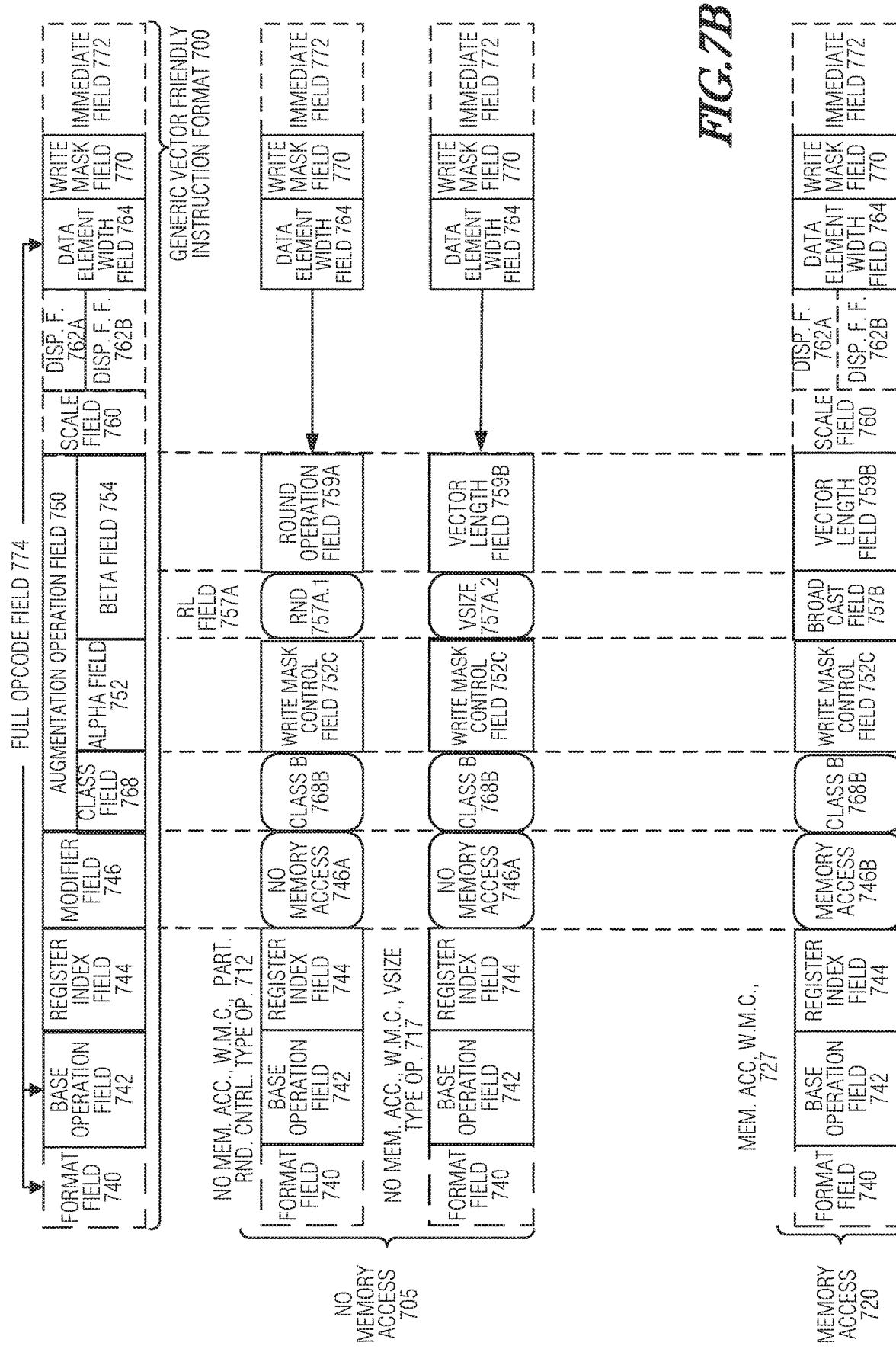

FIGS. 7A-7B are block diagrams illustrating a generic vector friendly instruction format and instruction templates thereof according to an embodiment. FIG. 7A is a block diagram illustrating a generic vector friendly instruction format and class A instruction templates thereof according to an embodiment; while FIG. 7B is a block diagram illustrating the generic vector friendly instruction format and class B instruction templates thereof according to an embodiment. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control partial round control type operation 712 instruction template and a no memory access, write mask control vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in an embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in an embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In an embodiment, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses 2scale*index+base).

Displacement Field 762A—its content is used as part of memory address generation (e.g., for address generation that uses 2scale*index+base+displacement).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in another embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in an embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-7B, the contents of this field select between class A and class B instructions. In FIGS. 7A-7B, rounded corner squares are used to indicate a specific value is present in a field (e.g., class A 768A and class B 768B for the class field 768 respectively in FIGS. 7A-7B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In an embodiment where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation, broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down. Round-towards-zero and Round-to-nearest). Thus, the round operation control field 759A allows for the changing of the rounding mode on a per instruction basis. In an embodiment where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Specific Vector Friendly Instruction Format

FIG. 8 is a block diagram illustrating a specific vector friendly instruction format according to an embodiment. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field. SIB field, displacement field, and immediate fields of the existing x86 instruction set with extensions. The fields from FIG. 7 into which the fields from FIG. 8 map are illustrated.

It should be understood that, although embodiments are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in an embodiment).

The second-fourth bytes (EVEX Bytes 1-3) include a number of bit fields providing specific capability.

REX field 805 (EVEX Byte 1, bits [7-5])—consists of an EVEX.R bit field (EVEX Byte 1, bit [7]—R), EVEX.X bit field (EVEX byte 1, bit [6]—X), and 757BEX byte 1, bit [5]—B). The EVEX.R, EVEX.X, and EVEX.B bit fields provide the same functionality as the corresponding VEX bit fields, and are encoded using 1s complement form. i.e. ZMM0 is encoded as 1111B, ZMM15 is encoded as 0000B. Other fields of the instructions encode the lower three bits of the register indexes as is known in the art (rrr, xxx, and bbb), so that Rrrr. Xxxx, and Bbbb may be formed by adding EVEX.R. EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In an embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]—mmmm)—its content encodes an implied leading opcode byte (0F, 0F 38, or 0F 3).

Data element width field 764 (EVEX byte 2, bit [7]—W) is represented by the notation EVEX.W. EVEX.W is used to define the granularity (size) of the datatype (either 32-bit data elements or 64-bit data elements).

EVEX.vvvv 820 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 111 lb. Thus. EVEX.vvvv field 820 encodes the 4 low-order bits of the first source register specifier stored in inverted (is complement) form. Depending on the instruction, an extra different EVEX bit field is used to extend the specifier size to 32 registers.

EVEX.U 768 Class field (EVEX byte 2, bit [2]—U)—If EVEX.U=0, it indicates class A or EVEX.U0; if EVEX.U=1, it indicates class B or EVEX.U1.

Prefix encoding field 825 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In an embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]—kkk)—its content specifies the index of a register in the write mask registers as previously described. In an embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to an embodiment. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to an embodiment. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
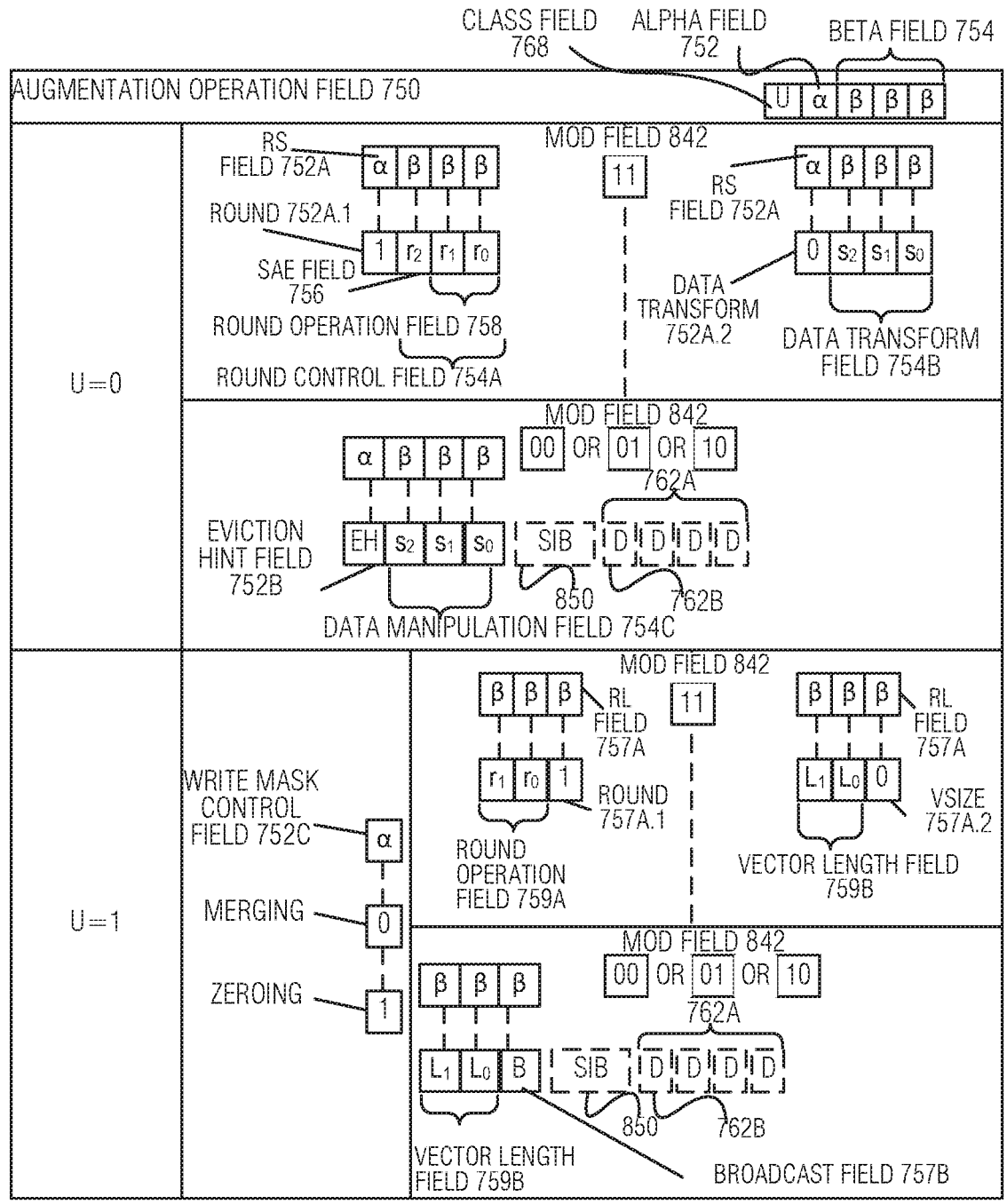

FIG. 8D is a block diagram illustrating the fields of the specific vector friendly instruction format 800 that make up the augmentation operation field 750 according to an embodiment. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]—EH) is interpreted as the rs field 752A. When the rs field 752A contains a 1 (round 752A.1), the beta field 754 (EVEX byte 3, bits [6:4]—SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]—SSS) is interpreted as a three bit data transform field 754B. When U=0 and the MOD field 842 contains 00, 01, or 10 (signifying a memory access operation), the alpha field 752 (EVEX byte 3, bit [7]—EH) is interpreted as the eviction hint (EH) field 752B and the beta field 754 (EVEX byte 3, bits [6:4]—SSS) is interpreted as a three bit data manipulation field 754C.

When U=1, the alpha field 752 (EVEX byte 3, bit [7]—EH) is interpreted as the write mask control (Z) field 752C. When U=1 and the MOD field 842 contains 11 (signifying a no memory access operation), part of the beta field 754 (EVEX byte 3, bit [4]—S0) is interpreted as the RL field 757A; when it contains a 1 (round 757A.1) the rest of the beta field 754 (EVEX byte 3, bit [6-5]—S2-1) is interpreted as the round operation field 759A, while when the RL field 757A contains a 0 (VSIZE 757.A2) the rest of the beta field 754 (EVEX byte 3, bit [6-5]—S2-1) is interpreted as the vector length field 759B (EVEX byte 3, bit [6-5]—L1-0). When U=1 and the MOD field 842 contains 00, 01, or 10 (signifying a memory access operation), the beta field 754 (EVEX byte 3, bits [6:4]—SSS) is interpreted as the vector length field 759B (EVEX byte 3, bit [6-5]—L1-0) and the broadcast field 757B (EVEX byte 3, bit [4]—B).

Register Architecture

Figure 9:
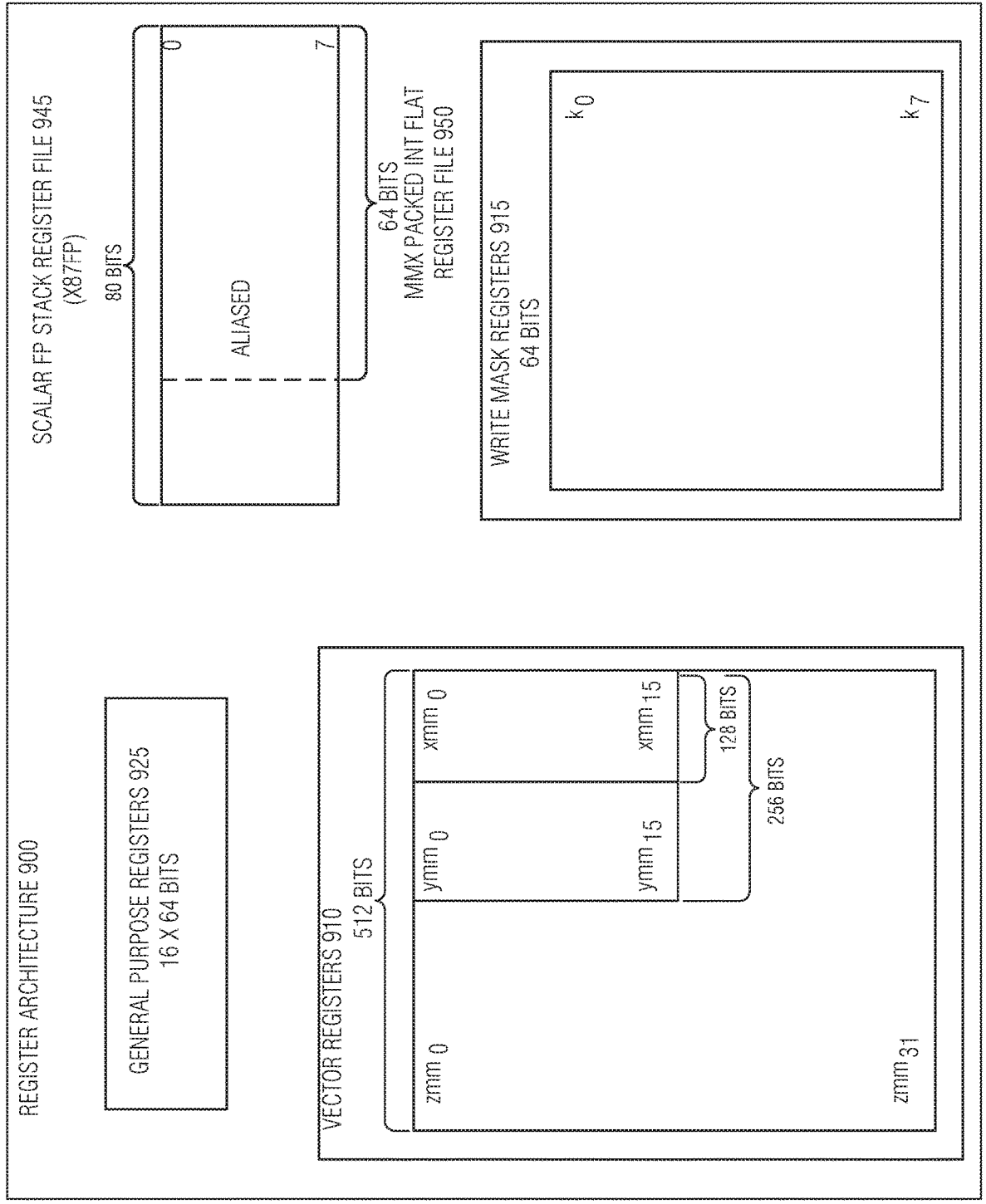
FIG. 9 is a block diagram of a register architecture according to an embodiment.

FIG. 9 is a block diagram of a register architecture 900 according to an embodiment. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in an embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in an embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Core architectures are described next, followed by descriptions of processors and computer architectures.

Core Architectures

In-Order and Out-of-Order Core Block Diagram

FIG. 10A is a block diagram illustrating both an in-order pipeline and a register renaming, out-of-order issue/execution pipeline according to embodiments. FIG. 10B is a block diagram illustrating both an embodiment of an in-order architecture core and a register renaming, out-of-order issue/execution architecture core to be included in a processor according to an embodiment. The solid lined boxes in FIGS. 10A-10B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In an embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In an embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In an embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions): the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In an embodiment, the core 1090 includes logic to support a packed data instruction set extension (e.g., AVX 1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific In-Order Core Architecture

Figure 11B:
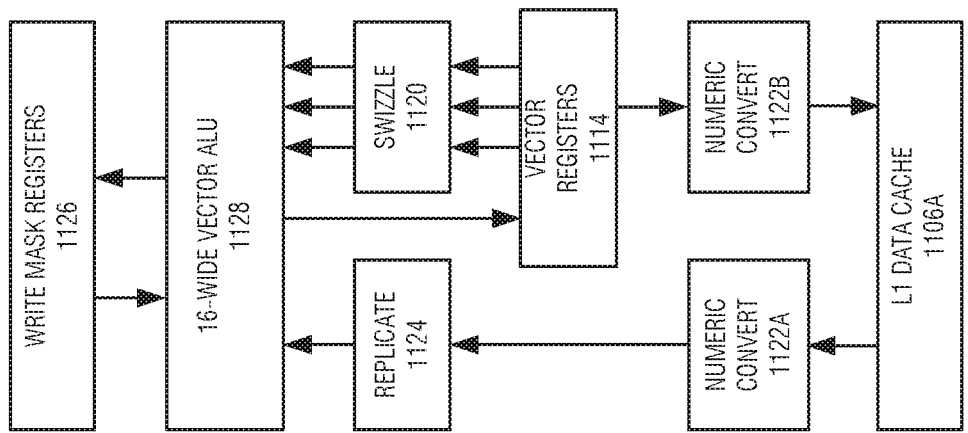
FIGS. 11A-11B illustrate block diagrams of a more specific in-order core architecture, which core would be one of several logic blocks (including other cores of the same type and/or different types) in a chip, according to an embodiment.
Figure 11A:
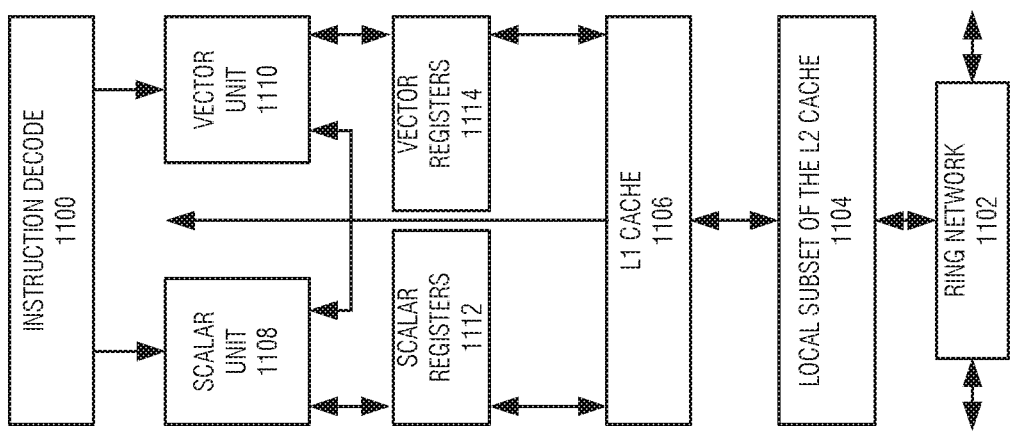

FIGS. 11A-11B illustrate a block diagram of a more specific in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to an embodiment. In an embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to an embodiment. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B. and replication with replication unit 1124 on the memory input. Write mask registers 1126 allow predicating resulting vector writes.

Figure 12:
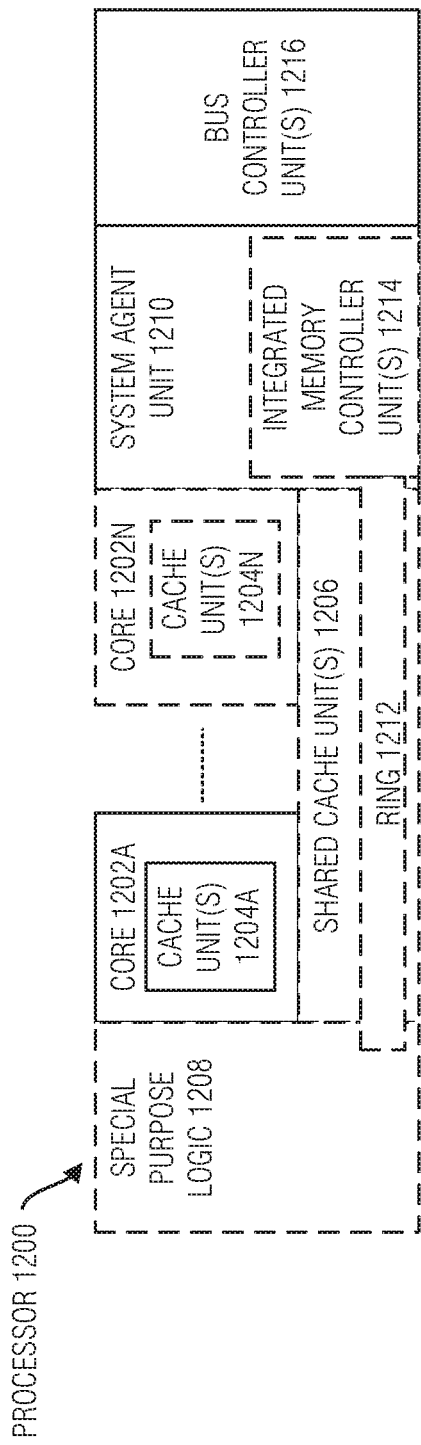
FIG. 12 is a block diagram of a processor that may have more than one core, may have an integrated memory controller, and may have integrated graphics according to an embodiment.

FIG. 12 is a block diagram of a processor 1200 that may have more than one core, may have an integrated memory controller, and may have integrated graphics according to embodiments. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor. GPGPU (general purpose graphics processing unit), a high-throughput many integrated core (MIC) coprocessor (including 30 or more cores), embedded processor, or the like. The processor 1200 may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In an embodiment, coherency is maintained between one or more cache units 1204A-N and cores 1202A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Computer Architectures

FIGS. 13-16 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
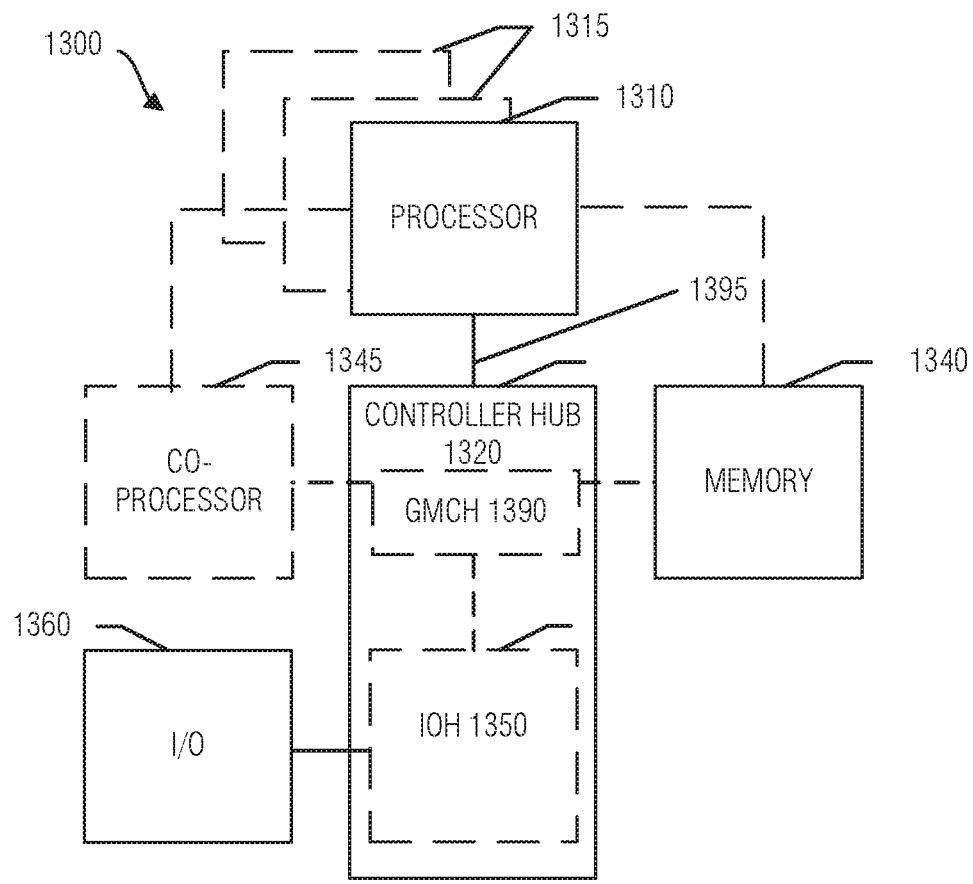
FIGS. 13-16 are block diagrams of computer architectures, according to an embodiment.

Referring now to FIG. 13, shown is a block diagram of a system 1300 according to an embodiment. The system 1300 may include one or more processors 1310, 1315, which are coupled to a controller hub 1320. In an embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In an embodiment, the coprocessor 1345 is a special-purpose processor, such as, for example, a high-throughput MIC processor, a network or communication processor, compression engine, graphics processor, GPGPU, embedded processor, or the like. In an embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In an embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
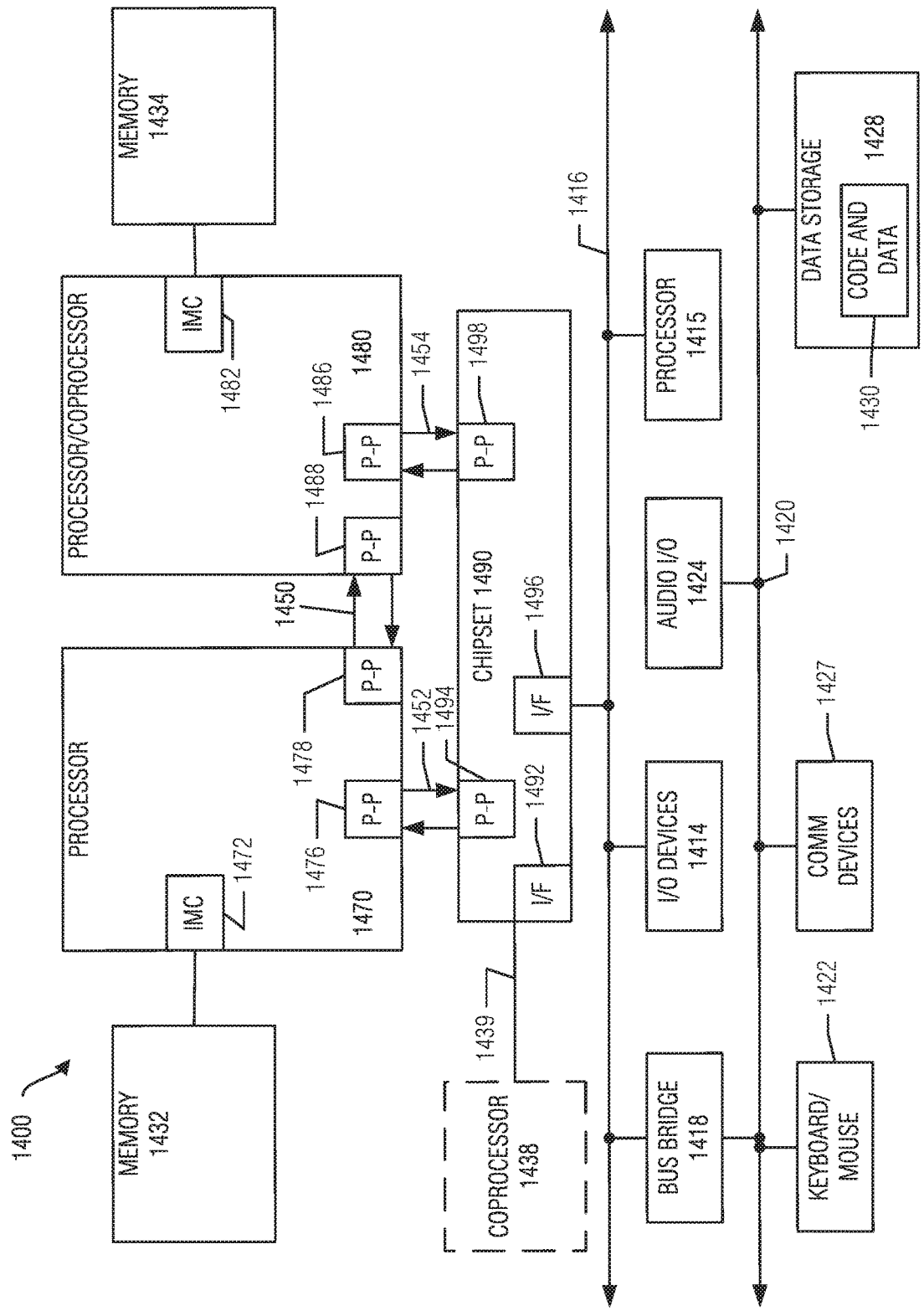

Referring now to FIG. 14, shown is a block diagram of a first more specific system 1400 in accordance with an embodiment. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In an embodiment, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In an embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In an embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In an embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In an embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in an embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
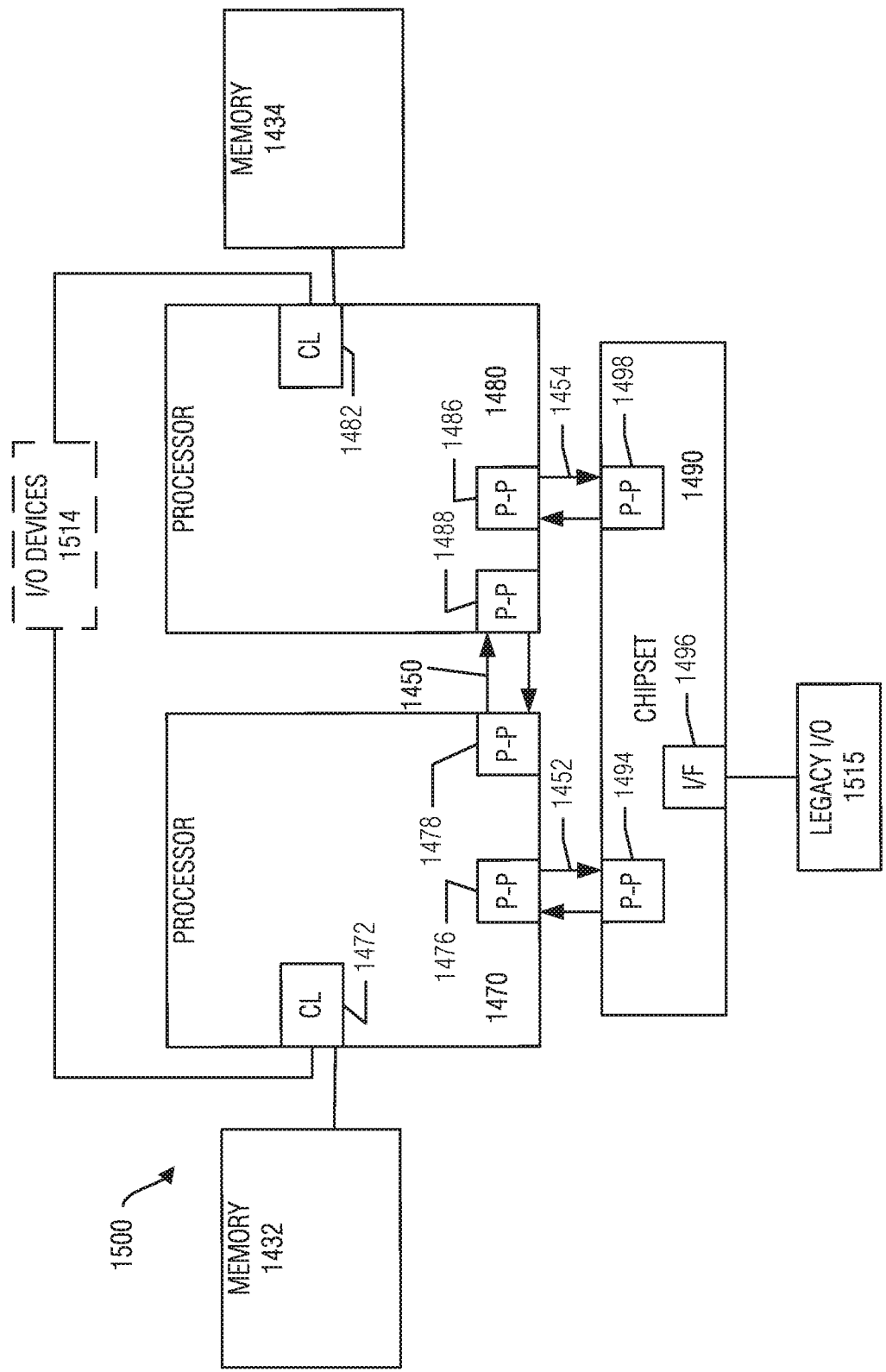

Referring now to FIG. 15, shown is a block diagram of a second more specific system 1500 in accordance with an embodiment. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
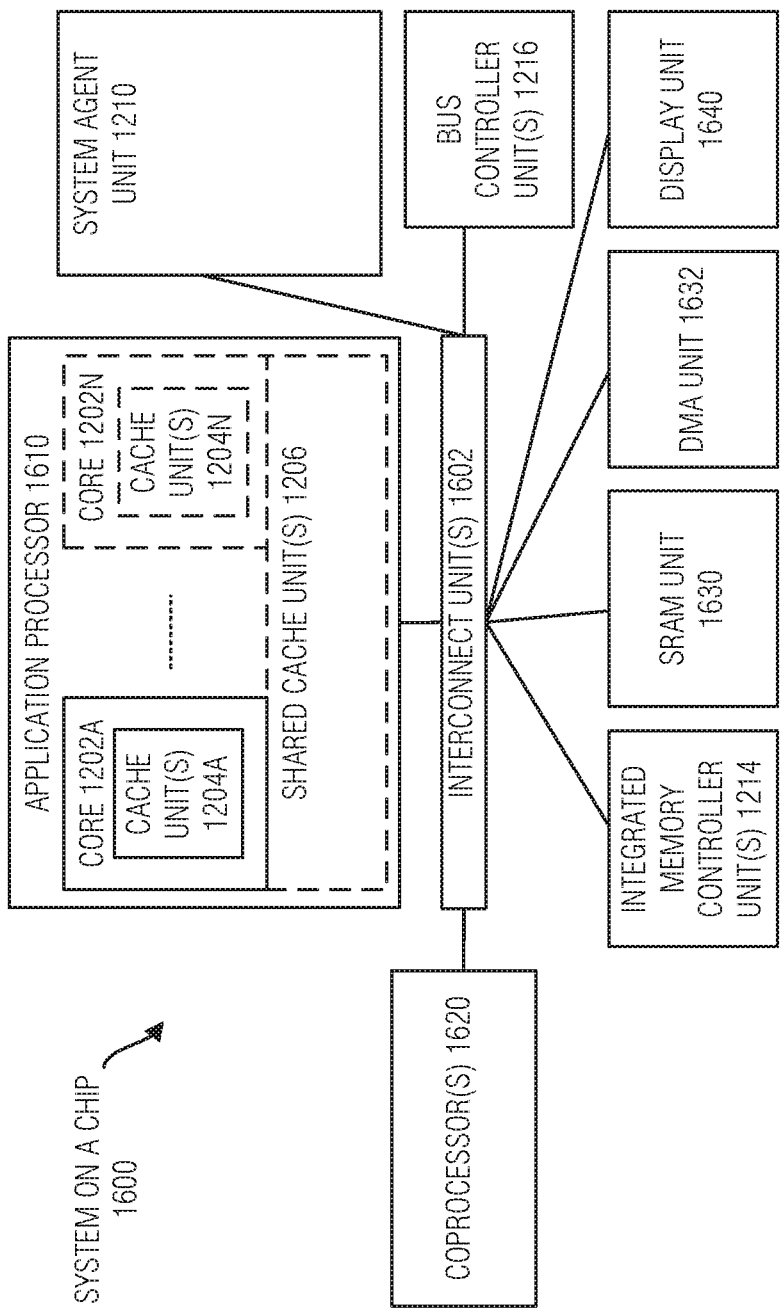

Referring now to FIG. 16, shown is a block diagram of a SoC 1600 in accordance with an embodiment. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N with integrated cache units 1204A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In an embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
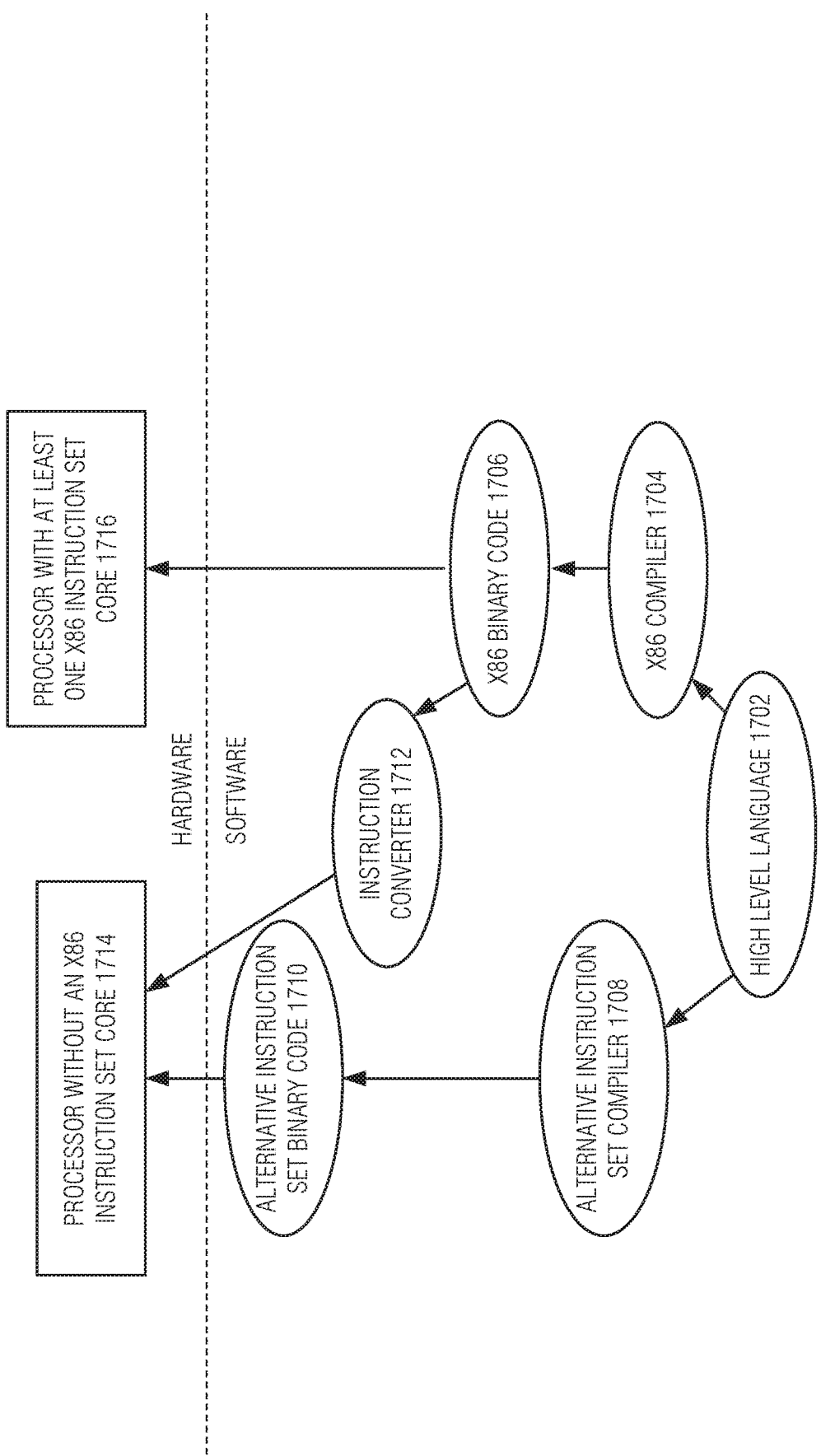
FIG. 17 is a block diagram contrasting the use of a software instruction converter to convert binary instructions in a source instruction set to binary instructions in a target instruction set according to an embodiment.

FIG. 17 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale. Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Additional Notes & Examples:

Example 1 is a system for computer memory management, the system comprising: a first memory device including a mapping table; a second memory device including a staging area; a third memory device including a dedup data region; and a controller operable to: receive a memory access request, the memory access request including an address and data; write the data to the staging area; and update the mapping table with the address.

In Example 2, the subject matter of Example 1 includes, wherein the first and second memory device are integrated in the same package.

In Example 3, the subject matter of Examples 1-2 includes, wherein the controller is to: monitor the staging area to determine a utilization amount; and reclaim memory capacity from duplicated data based on the utilization amount, the reclamation configured to deduplicate data in the staging area and move duplicate data to the dedup data region in the third memory device.

In Example 4, the subject matter of Example 3 includes, wherein to reclaim memory capacity, the controller is to: scan the staging area to identify duplicate data; write a copy of the duplicate data to the dedup data region at a destination address; update the mapping table with the destination address for entries that pointed to the duplicate data; and delete the duplicate data from the staging area.

In Example 5, the subject matter of Examples 3-4 includes, wherein to monitor the staging area, the controller is to determine that the utilization amount is under a first threshold, and wherein to reclaim memory capacity, the controller is to disable reclamation while the utilization amount is under the first threshold.

In Example 6, the subject matter of Example 5 includes, wherein the first threshold is 50% utilization of the staging area.

In Example 7, the subject matter of Examples 3-6 includes, wherein to monitor the staging area, the controller is to determine that the utilization amount is over a first threshold and under a second threshold, and wherein to reclaim memory capacity, the controller is to enable reclamation while the utilization amount is over the first threshold.

In Example 8, the subject matter of Example 7 includes, wherein the second threshold is 100% utilization of the staging area.

In Example 9, the subject matter of Examples 3-8 includes, wherein to monitor the staging area, the controller is to determine that the utilization amount is at or over a second threshold, and wherein to reclaim memory capacity, the controller is to enable reclamation while the utilization amount is at or over the second threshold, and wherein the controller is to disable further writes to the staging area while the utilization amount is at or over the second threshold.

In Example 10, the subject matter of Example 9 includes, wherein the controller is to enable a conventional deduplication process while the utilization amount is at or over the second threshold.

In Example 11, the subject matter of Examples 3-10 includes, wherein to configure the reclamation process, the controller is to use the utilization amount in a continuous function to configure a behavior of the reclamation process.

In Example 12, the subject matter of Examples 3-11 includes, wherein to reclaim memory capacity, the controller is to: select based on a temporal marker, addresses that refer to the staging area, the addresses stored in the mapping table; and process the addresses in the reclamation.

In Example 13, the subject matter of Example 12 includes, wherein the temporal marker is a timestamp that was stored when the corresponding data was written to the staging area.

In Example 14, the subject matter of Example 13 includes, wherein the timestamp is a 2-bit timestamp.

Example 15 is a method of computer memory management, the method comprising: receiving a memory access request, the memory access request including an address and data; writing the data to a staging area in a memory device, the staging area to store data temporarily before it is deduplicated; and updating a mapping table with the address, the mapping table stored in the memory device.

In Example 16, the subject matter of Example 15 includes, monitoring the staging area to determine a utilization amount; and configuring a reclamation process based on the utilization amount, the reclamation process configured to deduplicate data in the staging area and move duplicate data to a dedup data region in the memory device.

In Example 17, the subject matter of Example 16 includes, wherein the reclamation process is used to scan the staging area to identify duplicate data, write a copy of the duplicate data to the dedup data region at a destination address, update the mapping table with the destination address for entries that pointed to the duplicate data, and delete the duplicate data from the staging area.

In Example 18, the subject matter of Examples 16-17 includes, wherein monitoring the staging area comprises determining that the utilization amount is under a first threshold, and wherein configuring the reclamation process comprises disabling the reclamation process while the utilization amount is under the first threshold.

In Example 19, the subject matter of Example 18 includes, wherein the first threshold is 50% utilization of the staging area.

In Example 20, the subject matter of Examples 16-19 includes, wherein monitoring the staging area comprises determining that the utilization amount is over a first threshold and under a second threshold, and wherein configuring the reclamation process comprises enabling the reclamation process while the utilization amount is over the first threshold.

In Example 21, the subject matter of Example 20 includes, wherein the second threshold is 100% utilization of the staging area.

In Example 22, the subject matter of Examples 16-21 includes, wherein monitoring the staging area comprises determining that the utilization amount is at or over a second threshold, and wherein configuring the reclamation process comprises enabling the reclamation process while the utilization amount is at or over the second threshold, and wherein the method further comprises disabling further writes to the staging area while the utilization amount is at or over the second threshold.

In Example 23, the subject matter of Example 22 includes, enabling a conventional deduplication process while the utilization amount is at or over the second threshold.

In Example 24, the subject matter of Examples 16-23 includes, wherein configuring the reclamation process comprises using the utilization amount in a continuous function to configure a behavior of the reclamation process.

In Example 25, the subject matter of Examples 16-24 includes, wherein configuring the reclamation process comprises: selecting based on a temporal marker, addresses that refer to the staging area, the addresses stored in the mapping table; and processing the addresses in the reclamation process.

In Example 26, the subject matter of Example 25 includes, wherein the temporal marker is a timestamp that was stored when the corresponding data was written to the staging area.

In Example 27, the subject matter of Example 26 includes, wherein the timestamp is a 2-bit timestamp.

Example 28 is at least one machine-readable medium including instructions, which when executed by a machine, cause the machine to perform operations of any of the methods of Examples 15-25.

Example 29 is an apparatus comprising means for performing any of the methods of Examples 15-25.

Example 30 is an apparatus of computer memory management, the apparatus comprising: means for receiving a memory access request, the memory access request including an address and data; means for writing the data to a staging area in a memory device, the staging area to store data temporarily before it is deduplicated; and means for updating a mapping table with the address, the mapping table stored in the memory device.

In Example 31, the subject matter of Example 30 includes, means for monitoring the staging area to determine a utilization amount; and means for configuring a reclamation process based on the utilization amount, the reclamation process configured to deduplicate data in the staging area and move duplicate data to a dedup data region in the memory device.

In Example 32, the subject matter of Example 31 includes, wherein the reclamation process is used to scan the staging area to identify duplicate data, write a copy of the duplicate data to the dedup data region at a destination address, update the mapping table with the destination address for entries that pointed to the duplicate data, and delete the duplicate data from the staging area.

In Example 33, the subject matter of Examples 31-32 includes, wherein the means for monitoring the staging area comprise means for determining that the utilization amount is under a first threshold, and wherein the means for configuring the reclamation process comprise means for disabling the reclamation process while the utilization amount is under the first threshold.

In Example 34, the subject matter of Example 33 includes, wherein the first threshold is 50% utilization of the staging area.

In Example 35, the subject matter of Examples 31-34 includes, wherein the means for monitoring the staging area comprise means for determining that the utilization amount is over a first threshold and under a second threshold, and wherein the means for configuring the reclamation process comprise means for enabling the reclamation process while the utilization amount is over the first threshold.

In Example 36, the subject matter of Example 35 includes, wherein the second threshold is 100% utilization of the staging area.

In Example 37, the subject matter of Examples 31-36 includes, wherein the means for monitoring the staging area comprise means for determining that the utilization amount is at or over a second threshold, and wherein the means for configuring the reclamation process comprise means for enabling the reclamation process while the utilization amount is at or over the second threshold, and wherein the apparatus further comprise means for disabling further writes to the staging area while the utilization amount is at or over the second threshold.

In Example 38, the subject matter of Example 37 includes, means for enabling a conventional deduplication process while the utilization amount is at or over the second threshold.

In Example 39, the subject matter of Examples 31-38 includes, wherein the means for configuring the reclamation process comprise using the utilization amount in a continuous function to configure a behavior of the reclamation process.

In Example 40, the subject matter of Examples 31-39 includes, wherein the means for configuring the reclamation process comprise: means for selecting based on a temporal marker, addresses that refer to the staging area, the addresses stored in the mapping table; and means for processing the addresses in the reclamation process.

In Example 41, the subject matter of Example 40 includes, wherein the temporal marker is a timestamp that was stored when the corresponding data was written to the staging area.

In Example 42, the subject matter of Example 41 includes, wherein the timestamp is a 2-bit timestamp.

Example 43 is at least one machine-readable medium including instructions for computer memory management, the instructions when executed by a machine, cause the machine to perform operations comprising: receiving a memory access request, the memory access request including an address and data; writing the data to a staging area in a memory device, the staging area to store data temporarily before it is deduplicated; and updating a mapping table with the address, the mapping table stored in the memory device.

In Example 44, the subject matter of Example 43 includes, monitoring the staging area to determine a utilization amount; and configuring a reclamation process based on the utilization amount, the reclamation process configured to deduplicate data in the staging area and move duplicate data to a dedup data region in the memory device.

In Example 45, the subject matter of Example 44 includes, wherein the reclamation process is used to scan the staging area to identify duplicate data, write a copy of the duplicate data to the dedup data region at a destination address, update the mapping table with the destination address for entries that pointed to the duplicate data, and delete the duplicate data from the staging area.

In Example 46, the subject matter of Examples 44-45 includes, wherein monitoring the staging area comprises determining that the utilization amount is under a first threshold, and wherein configuring the reclamation process comprises disabling the reclamation process while the utilization amount is under the first threshold.

In Example 47, the subject matter of Example 46 includes, wherein the first threshold is 50% utilization of the staging area.

In Example 48, the subject matter of Examples 44-47 includes, wherein monitoring the staging area comprises determining that the utilization amount is over a first threshold and under a second threshold, and wherein configuring the reclamation process comprises enabling the reclamation process while the utilization amount is over the first threshold.

In Example 49, the subject matter of Example 48 includes, wherein the second threshold is 100% utilization of the staging area.

In Example 50, the subject matter of Examples 44-49 includes, wherein monitoring the staging area comprises determining that the utilization amount is at or over a second threshold, and wherein configuring the reclamation process comprises enabling the reclamation process while the utilization amount is at or over the second threshold, and wherein the machine-readable medium further comprises disabling further writes to the staging area while the utilization amount is at or over the second threshold.

In Example 51, the subject matter of Example 50 includes, enabling a conventional deduplication process while the utilization amount is at or over the second threshold.

In Example 52, the subject matter of Examples 44-51 includes, wherein configuring the reclamation process comprises using the utilization amount in a continuous function to configure a behavior of the reclamation process.

In Example 53, the subject matter of Examples 44-52 includes, wherein configuring the reclamation process comprises: selecting based on a temporal marker, addresses that refer to the staging area, the addresses stored in the mapping table; and processing the addresses in the reclamation process.

In Example 54, the subject matter of Example 53 includes, wherein the temporal marker is a timestamp that was stored when the corresponding data was written to the staging area.

In Example 55, the subject matter of Example 54 includes, wherein the timestamp is a 2-bit timestamp.

Example 56 is at least one machine-readable medium including instructions that, when executed by processing circuitry, cause the processing circuitry to perform operations to implement of any of Examples 1-55.

Example 57 is an apparatus comprising means to implement of any of Examples 1-55.

Example 58 is a system to implement of any of Examples 1-55.

Example 59 is a method to implement of any of Examples 1-55.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second." and "third." etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for computer memory management, the system comprising:
    a first memory device including a mapping table;
    a second memory device including a staging area;
    a third memory device including a dedup data region; and
    a controller operable to:
        receive a memory access request, the memory access request including an address and data;
        write the data to the staging area;
        update the mapping table with the address;
        monitor the staging area;
        determine a utilization amount is over a first threshold and under a second threshold, the utilization amount representing an amount of used storage capacity of the staging area; and
        enable a reclamation process to reclaim memory capacity from duplicated data based on the utilization amount while the utilization amount is over the first threshold, the reclamation process configured to deduplicate data in the staging area by moving duplicate data to the dedup data region in the third memory device.

2. The system of claim 1, wherein the first and second memory device ar integrated in the same package.

3. The system of claim 1, wherein to reclaim memory capacity, the controller is to:
    scan the staging area to identify duplicate data;
    write a copy of the duplicate data to the dedup data region at a destination address;
    update the mapping table with the destination address for entries that pointed to the duplicate data; and
    delete the duplicate data from the staging area.

4. The system of claim 1, wherein to monitor the staging area, the controller is to determine that the utilization amount is under a first threshold, and
    wherein to reclaim memory capacity, the controller is to disable the reclamation process while the utilization amount is under the first threshold.

5. The system of claim 4, wherein the first threshold is 50% utilization of the staging area.

6. The system of claim 1, wherein the second threshold is 100% utilization of the staging area.

7. The system of claim 1, wherein to monitor the staging area, the controller is to determine that the utilization amount is at or over a second threshold, and
    wherein to reclaim memory capacity, the controller is to enable the reclamation process while the utilization amount is at or over the second threshold, and
    wherein the controller is to disable further writes to the staging area while the utilization amount is at or over the second threshold.

8. The system of claim 1, wherein to configure the reclamation process, the controller is to use the utilization amount in a continuous function to configure a behavior of the reclamation process.

9. The system of claim 1, wherein to reclaim memory capacity, the controller is to:

select, based on a temporal marker, addresses that refer to the staging area, the addresses stored in the mapping table; and process the addresses in the reclamation process.

10. The system of claim 9, wherein the temporal marker is a timestamp that was stored when the corresponding data was written to the staging area.

11. The system of claim 10, wherein the timestamp is a 2-bit timestamp.

12. A method of computer memory management, the method comprising:

receiving a memory access request, the memory access request including an address and data;

writing the data to a staging area in a memory device, the staging area to store data temporarily before it is deduplicated;

updating a mapping table with the address, the mapping table stored in the memory device;

monitoring the staging area to determine a utilization amount, the utilization amount representing an amount of used storage capacity of the staging area; and configuring a reclamation process based on the utilization amount, the reclamation process configured to deduplicate data in the staging area by moving duplicate data to a dedup data region in the memory device;

wherein monitoring the staging area comprises determining that the utilization amount is over a first threshold and under a second threshold, and wherein configuring the reclamation process comprises enabling the reclamation process while the utilization amount is over the first threshold.

13. The method of claim 12, wherein the reclamation process is used to scan the staging area to identify duplicate data, write a copy of the duplicate data to the dedup data region at a destination address, update the mapping table with the destination address for entries that pointed to the duplicate data, and delete the duplicate data from the staging area.

14. The method of claim 12, wherein monitoring the staging area comprises determining that the utilization amount is under a first threshold, and wherein configuring the reclamation process comprises disabling the reclamation process while the utilization amount is under the first threshold.

15. The method of claim 14, wherein the first threshold is 50% utilization of the staging area.

16. The method of claim 12, wherein monitoring the staging area comprises determining that the utilization amount is over a first threshold and under a second threshold, and wherein configuring the reclamation process comprises enabling the reclamation process while the utilization amount is over the first threshold.

17. The method of claim 16, wherein the second threshold is 100% utilization of the staging area.

18. The method of claim 12, wherein monitoring the staging area comprises determining that the utilization amount is at or over a second threshold, and wherein configuring the reclamation process comprises enabling the reclamation process while the utilization amount is at or over the second threshold, and wherein the method further comprises disabling further writes to the staging area while the utilization amount is at or over the second threshold.

19. At least one non-transitory machine-readable medium including instructions for computer memory management, the instructions when executed by a machine, cause the machine to perform operations comprising:

receiving a memory access request, the memory access request including an address and data;

writing the data to a staging area in a memory device, the staging area to store data temporarily before it is deduplicated;

updating a mapping table with the address, the mapping table stored in the memory device;

monitoring the staging area to determine a utilization amount, the utilization amount representing an amount of used storage capacity of the staging area; and configuring a reclamation process based on the utilization amount, the reclamation process configured to deduplicate data in the staging area by moving duplicate data to a dedup data region in the memory device;

wherein monitoring the staging area comprises determining that the utilization amount is over a first threshold and under a second threshold, and wherein configuring the reclamation process comprises enabling the reclamation process while the utilization amount is over the first threshold.

* * * * *

UNITED STATES PATENT AND TRADEMARK OFFICE
CERTIFICATE OF CORRECTION

PATENT NO. : 10,732,880 B2
APPLICATION NO. : 15/868787
DATED : August 4, 2020
INVENTOR(S) : Azizi et al.

Page 1 of 1

It is certified that error appears in the above-identified patent and that said Letters Patent is hereby corrected as shown below:

In the Claims

In Column 36, Line 34, in Claim 2, delete "ar" and insert --are-- therefor

Signed and Sealed this
Fifth Day of January, 2021

Andrei Iancu
*Director of the United States Patent and Trademark Office*